Feb. 18, 1947.   H. B. FRASHER   2,415,999
HELICOPTER
Filed Oct. 14, 1943   8 Sheets-Sheet 3
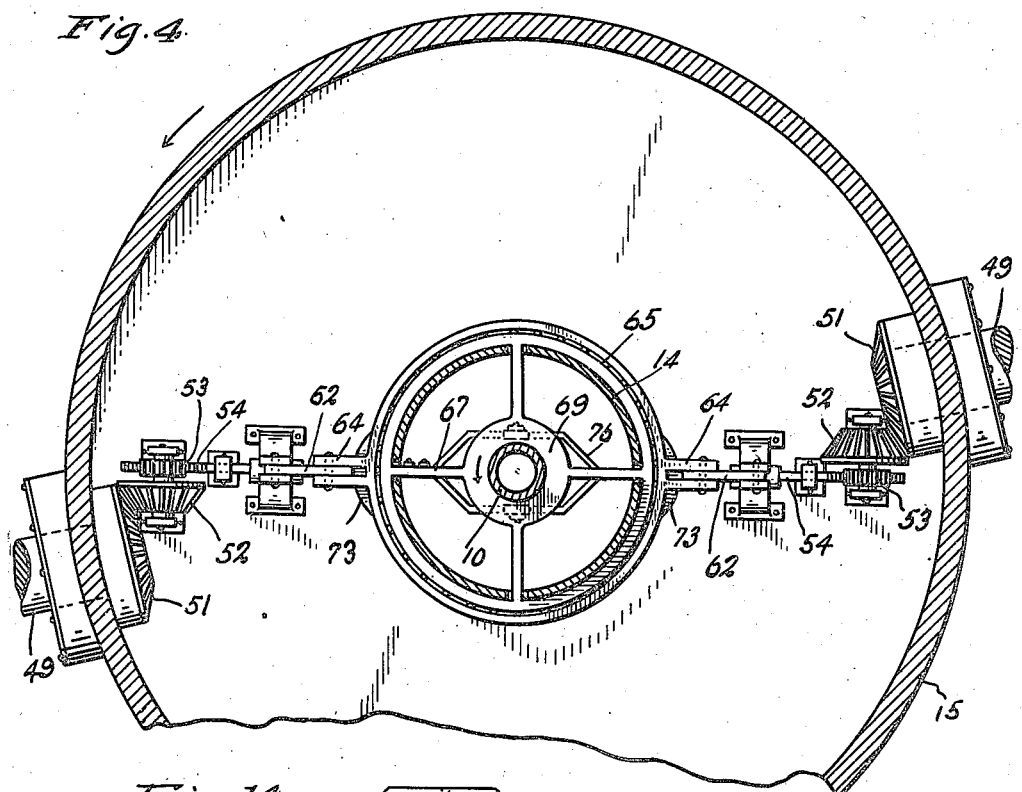
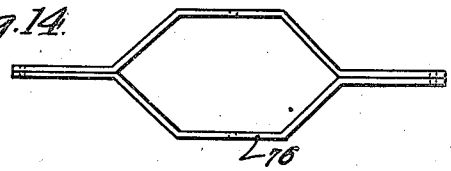
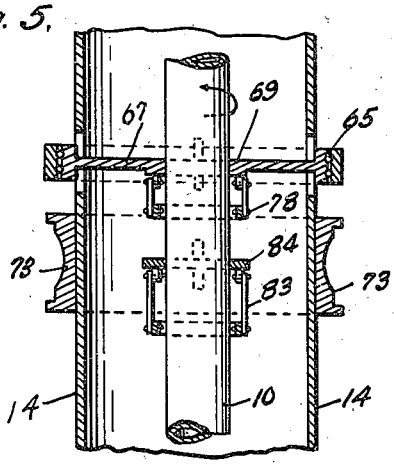
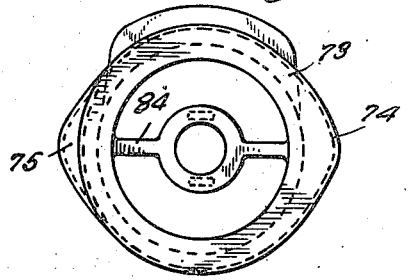
Inventor
HAROLD B. FRASHER
By Clarence A. O'Brien
and Harvey B. Jacobson
Attorneys Feb. 18, 1947.  H. B. FRASHER  2,415,999
HELICOPTER
Filed Oct. 14, 1943  8 Sheets-Sheet 4
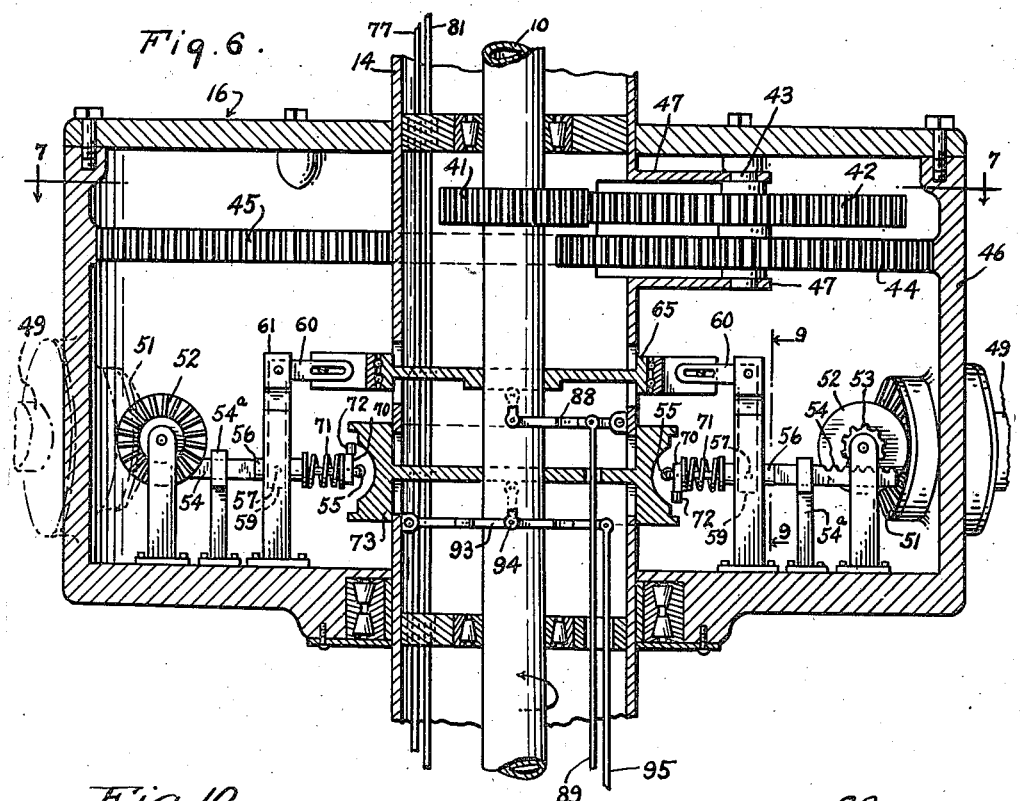
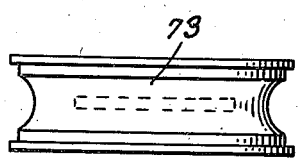
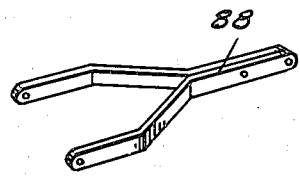
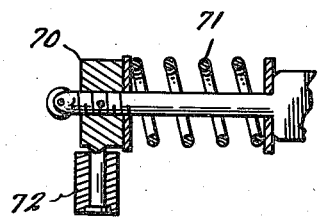
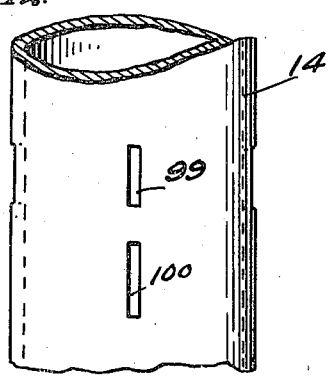
Inventor
HAROLD B. FRASHER
By Clarence A. O'Brien
and Harvey B. Jacobson
Attorneys Feb. 18, 1947. H. B. FRASHER 2,415,999
HELICOPTER
Filed Oct. 14, 1943 8 Sheets-Sheet 5

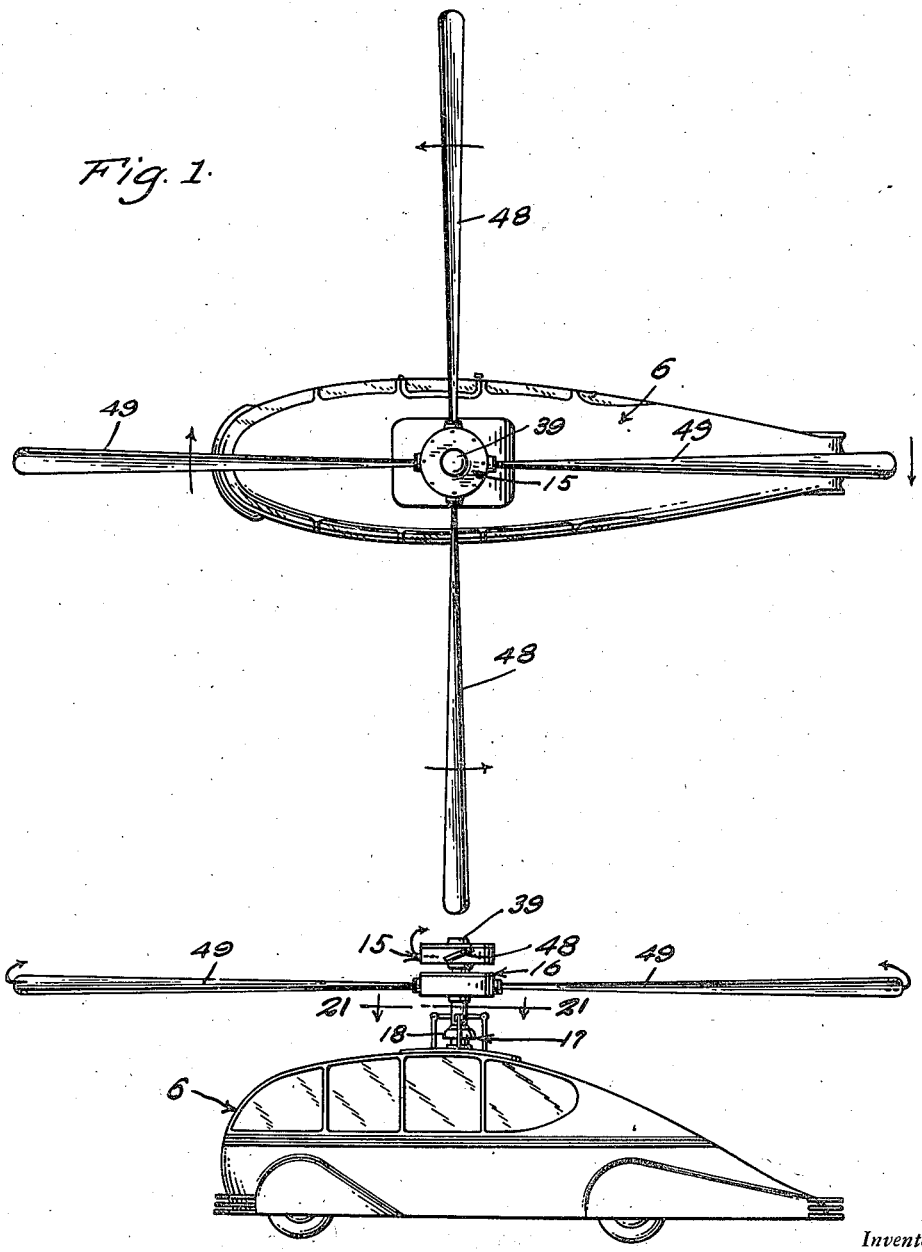

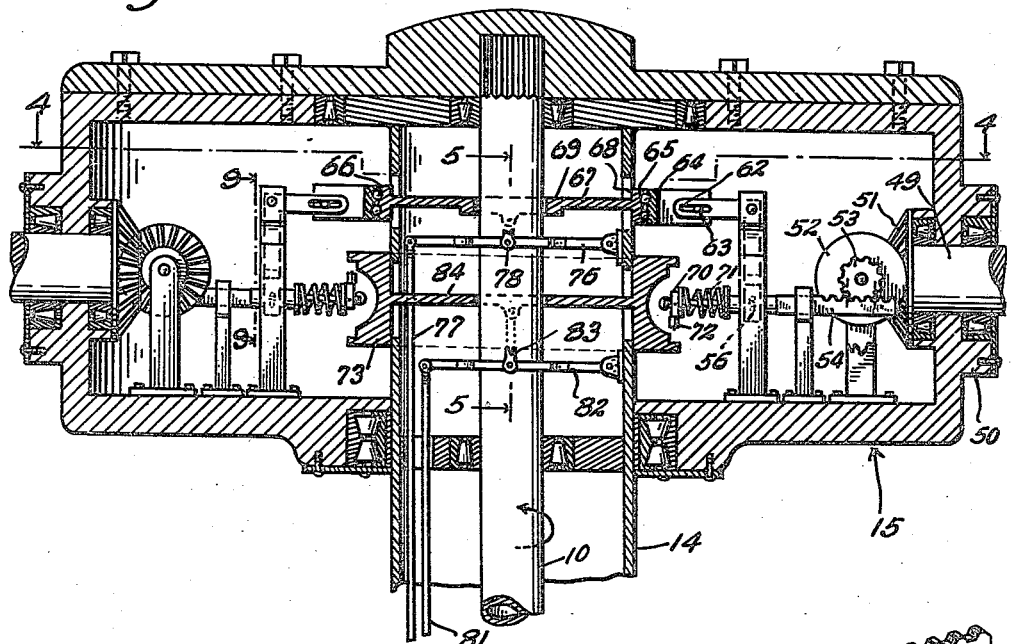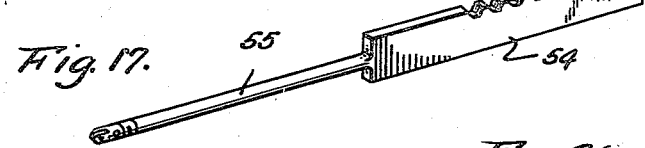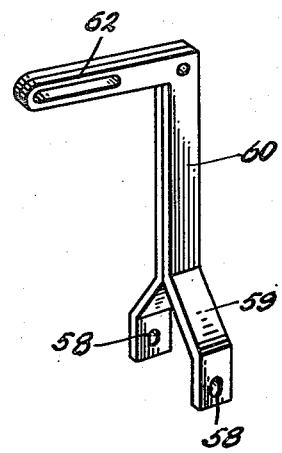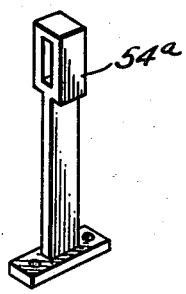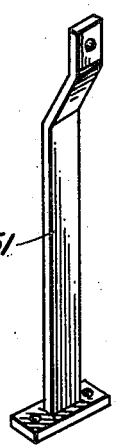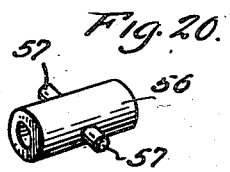

Inventor
HAROLD B. FRASHER
By Clarence A. O'Brien
and Harvey B. Jacobson
Attorneys Feb. 18, 1947. H. B. FRASHER 2,415,999
HELICOPTER
Filed Oct. 14, 1943 8 Sheets-Sheet 6
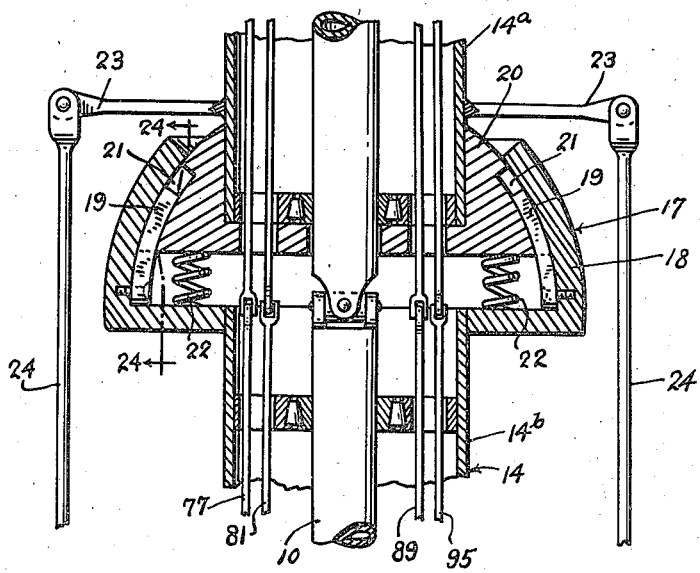
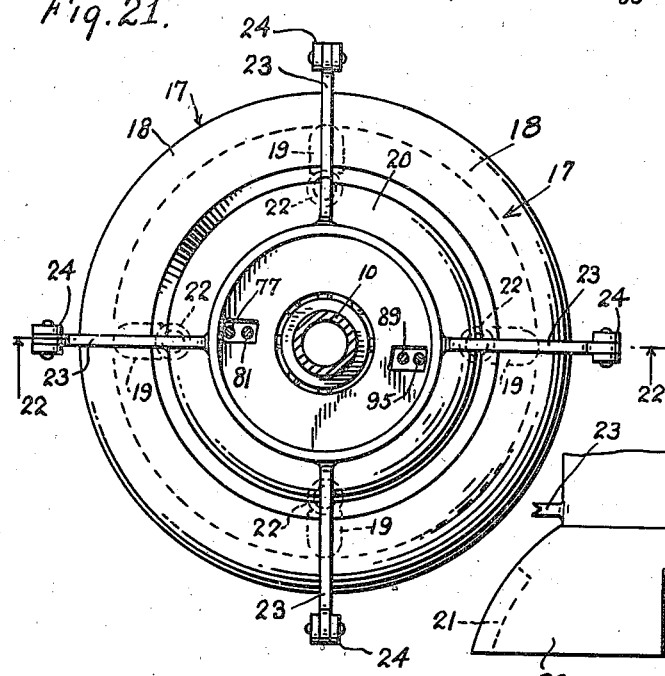
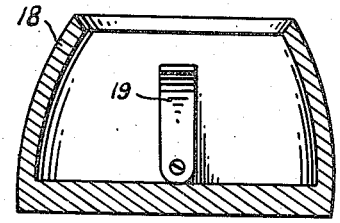
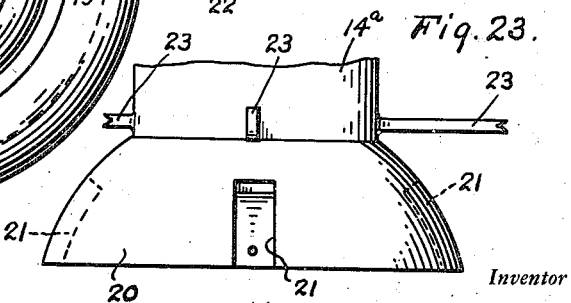
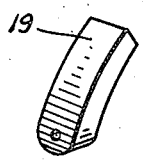
Inventor
HAROLD B. FRASHER
By Clarence A. O'Brien
and Harvey B. Jacobson
Attorneys

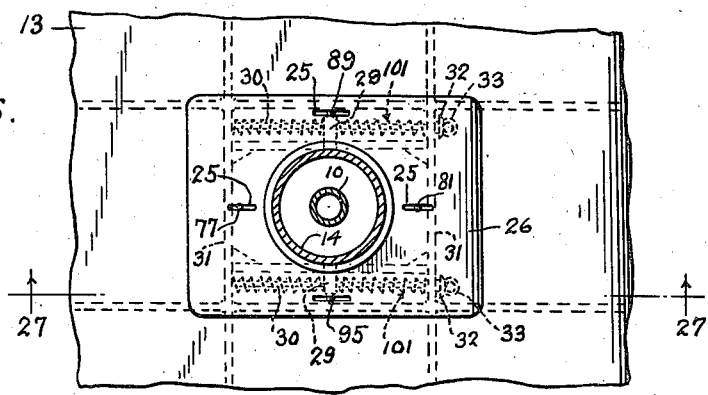
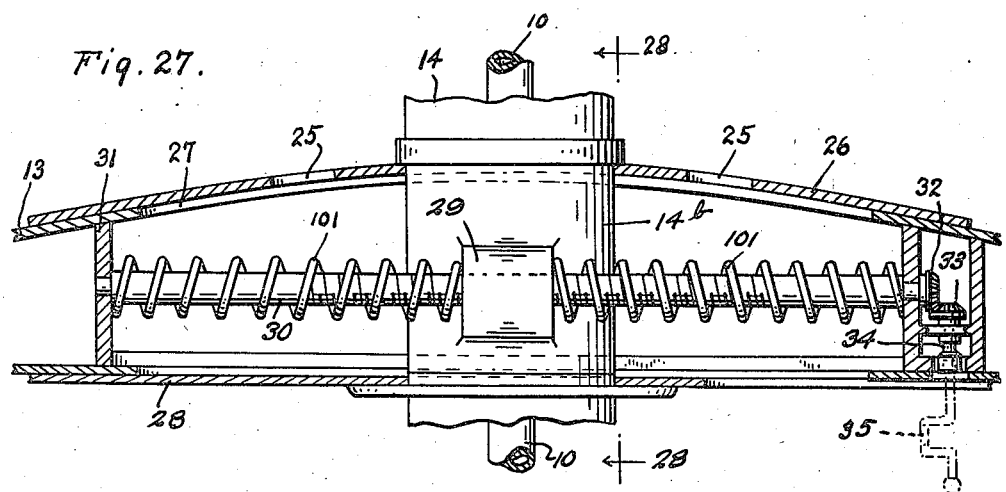
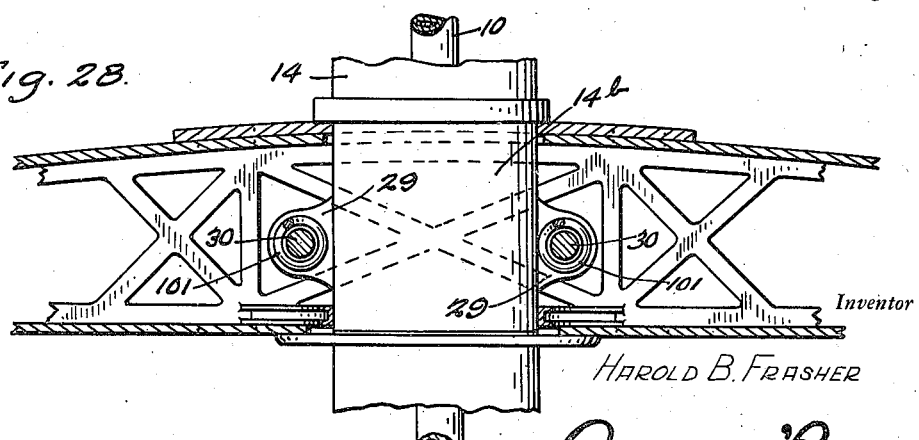

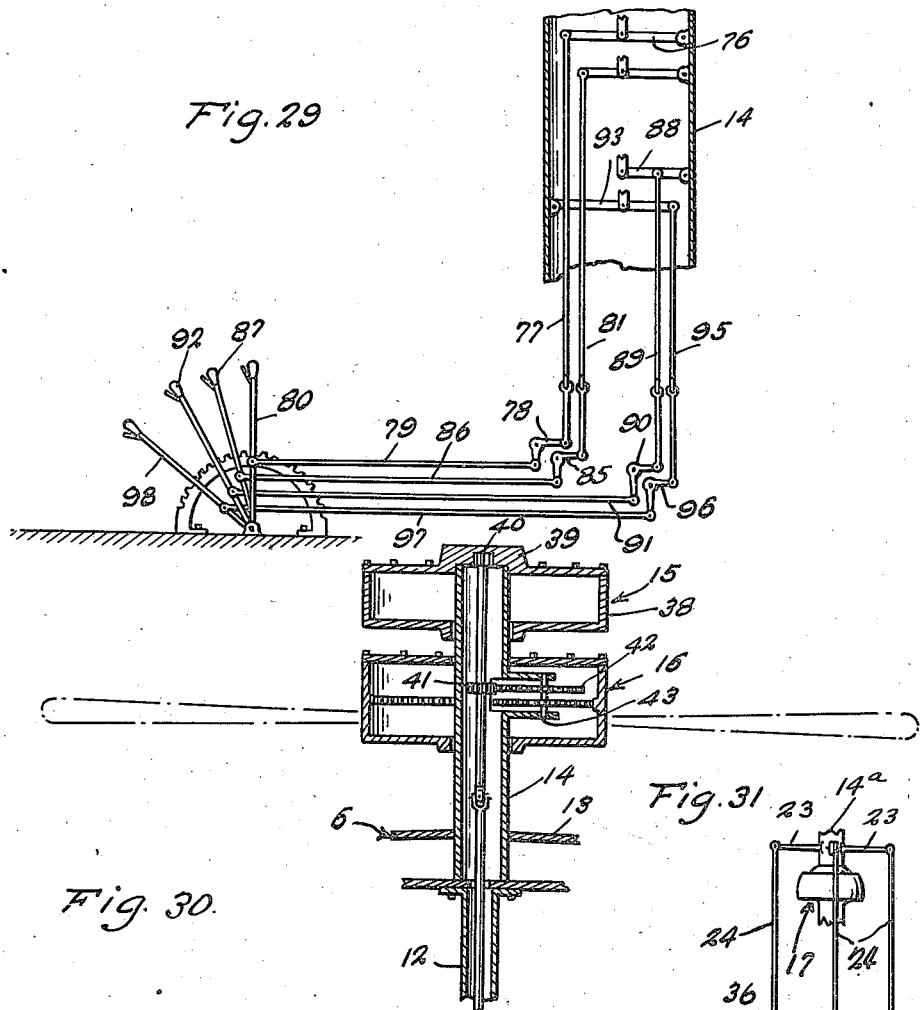
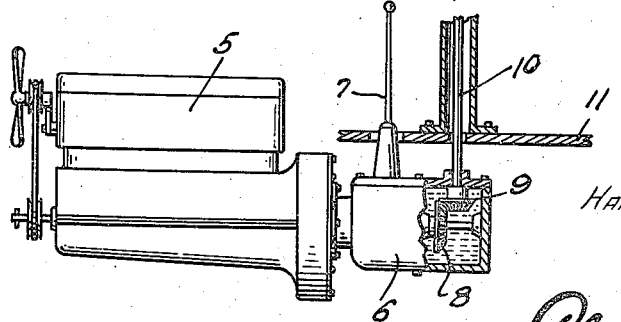

Patented Feb. 18, 1947

2,415,999

UNITED STATES PATENT OFFICE 2,415,999

HELICOPTER

Harold B. Frasher, Fresno, Calif.

Application October 14, 1943, Serial No. 506,253

2 Claims. (Cl. 244—17)

This invention relates to new and useful improvements in aeronautics and more particularly to a helicopter.

The principal object of the present invention is to provide a helicopter wherein a passenger carrying body is employed and has its entire load suspended from its top.

Another important object of the invention is to provide a helicopter wherein various adjustments are provided for shifting the propulsion head to change the center of gravity and maintain the craft on an even keel, to adjust the pitch of the blades to take care of various contingencies such as a sudden side slip, etc., and various other controlling factors.

Other objects and advantages of the invention will become apparent to the reader of the following description.

In the drawings:

Figure 1 is a top plan view of the helicopter.

Figure 2 is a side elevation.

Figure 3 is a fragmentary vertical sectional view through the upper propulsion head.

Figure 4 is a horizontal sectional view taken on the line 4—4 of Figure 3.

Figure 5 is a fragmentary vertical sectional view taken substantially on the line 5—5 of Figure 3.

Figure 6 is a fragmentary vertical sectional view through the lower propulsion head.

Figure 10 is a side elevational view of the cam.

Figure 11 is a perspective view of the upper yoke shown in Figure 10.

Figure 12 is a fragmentary side elevational view of the tubular housing showing the slot for the spider of the cam.

Figure 13 is an enlarged fragmentary detailed sectional view of one of the cam riders.

Figure 14 is a top plan view of the lower yoke shown in Figure 6.

Figure 15 is a top plan view of the cam.

Figure 16 is a perspective view of the bellcrank shown for the pitch control.

Figure 17 is a perspective view of the rack bar.

Figure 18 is a perspective view of one of the posts for the bellcrank shown in Figure 16.

Figure 19 is a perspective view of a guide for the rack bar shown in Figure 17.

Figure 20 is a perspective view of the rocker through which the stem of the rack bar shown in Figure 17 is disposed.

Figure 21 is a fragmentary enlarged detailed sectional view taken on the line 21—21 of Figure 2.

Figure 22 is a fragmentary vertical sectional view taken on the line 22—22 of Figure 21.

Figure 23 is a fragmentary side elevational view of the inner section of the joint shown in Figure 22.

Figure 24 is a fragmentary vertical sectional view taken substantially on the line 24—24 of Figure 22.

Figure 25 is a perspective view of the guide lug shown in Figure 24.

Figure 26 is a fragmentary vertical sectional view through the roof of the body, showing the adjusting means.

Figure 27 is an enlarged detailed sectional view taken on the line 27—27 of Figure 26.

Figure 28 is a fragmentary vertical sectional view taken on the line 28—28 of Figure 27.

Figure 29 is a diagrammatic view showing the control means for the upper and lower heads.

Figure 30 is a diagrammatic view with certain parts removed showing the power drive for the upper and lower head.

Figure 31 is a fragmentary diagrammatic view showing the means for adjusting the heads at the universal joint.

Figure 7:
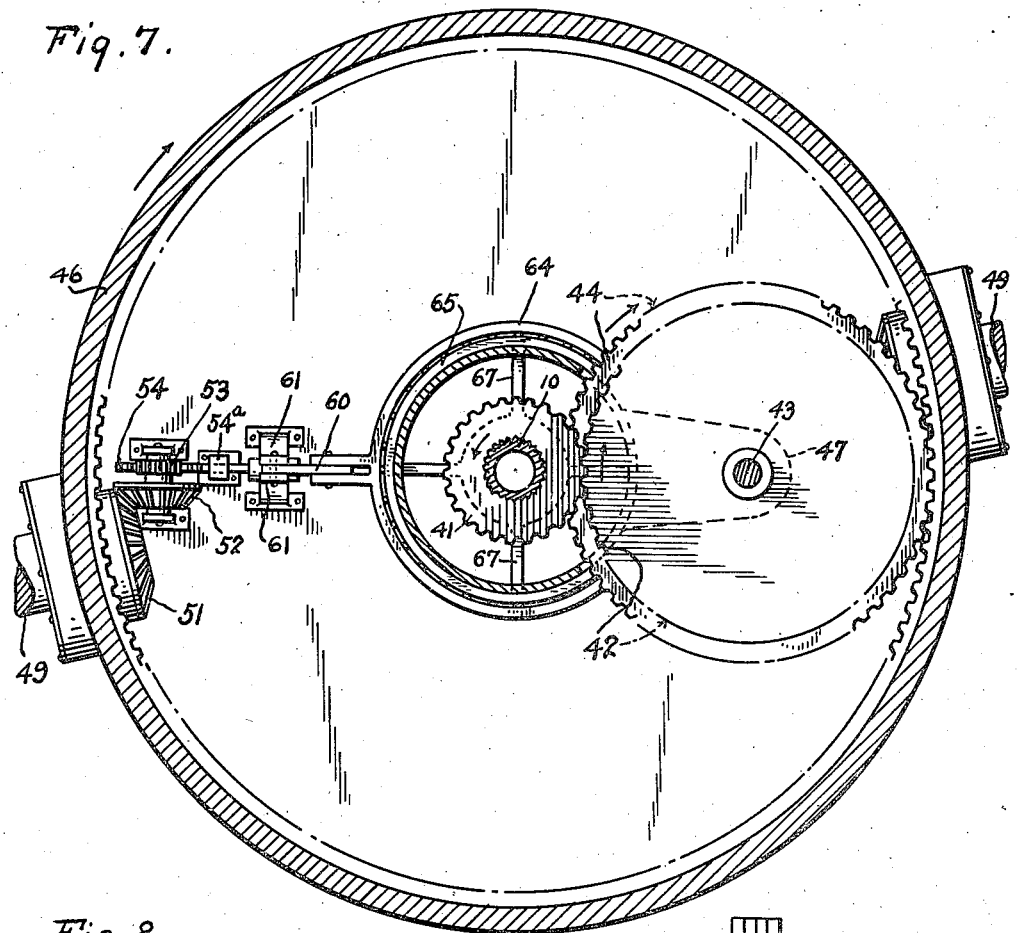
Figure 7 is a horizontal sectional view taken on the line 7—7 of Figure 6.
Figure 8:
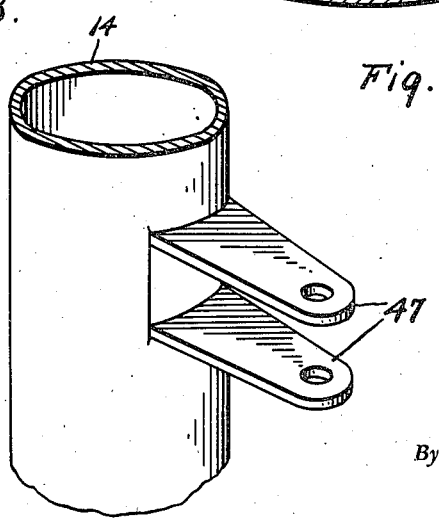
Figure 8 is a fragmentary perspective view of the tubular housing.
Figure 9:
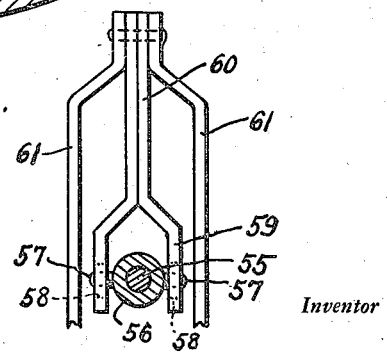
Figure 9 is a vertical sectional view taken on the line 9—9 of Figure 6.

Referring to the drawings wherein like numerals designate like parts, it can be seen in Figure 30, that numeral 5 denotes a power plant such as an automobile engine for driving the vehicle structure generally referred to by numeral 6 (see Figure 2), it being understood that the vehicle can be used on land as well as in the air. A transmission 6 is provided for the motor 5 and this has a gear shift 7 which is connected with a gear 8 and this gear is, in turn, connected to a gear 9 on a vertical shaft 10 which extends vertically through the floor 11 of the vehicle 6 and through a vertical tube 12, which terminates at the roof 13 of the vehicle 6. The shaft 10 extends through the roof 13 and through a vertical shaft housing 14 upon which upper and lower propulsion heads generally referred to by numerals 15, 16 are located.

The housing 14 is divided into an upper section 14a and a lower section 14b, as shown in Figure 22 and these sections are connected by a joint generally referred to by numeral 17 and which consists of a bowl 18 having a plurality of vertically disposed lugs 19 secured against the inner side of the side wall thereof. The bowl 18 is secured to the upper end of the section 14b of the tubular housing 14, while a hemispherical-shaped member 20 is carried by the upper section 14a and this has channels 21 therein for receiving the lugs 19. Compression springs 22 are interposed between the bottom of the bowl 18 and the bottom of the hemispherical-shaped member 20, serving to always maintain the section 14a upright unless manually controlled.

Arms 23 radiate from the upper section 14a, one above each of the lugs 19 and to these arms are pivotally secured the upper ends of control rods 24, which extend down through slots 25 in a slidable cover 26, which cover is disposed over an opening 27 in the roof 13 of the vehicle 6. The plate 26 is provided for the upper portion of the roof, while a slide plate 28 is provided for the lower portion of the roof and both plates are carried by the lower portion of the lower section 14b of the tubular housing 14. This portion of the section 14b has laterally disposed ears 29, 29 having threaded bores therethrough for receiving screw shafts 30, these shafts having their ends journaled in partitions or supporting plates 31, with each shaft having one end equipped with a bevel gear 32 meshing with a bevel gear 33 on a vertical shaft 34 which can be actuated by a hand crank 35. Obviously, by operating the crank 35, the lower section 14b as well as the upper section 14a and both propulsion heads 15, 16 may be shifted horizontally in order to change the center of gravity of the entire machine.

Obviously, in the event of a side slip or where it is desired to have more pressure built up on one side or at one point of the machine than in another, the heads are tilted and this by the rods 24, which, as before stated, extend through the plates 26, 28 and by bellcranks (see Figure 31) 36 are connected to rods 37 which, in turn, are connected to suitable manual means (not shown).

Now referring again to Figure 30, it can be seen that the drive shaft 10 extends upwardly through the tube 12 and through the tubular housing 14 into both heads 15, 16.

The upper head 15 has a housing 38, to the top 39 of which the upper end of the shaft 10 is secured as at 40.

Down the shaft 10 a short way and within the head 16, the shaft 10 is provided with a gear 41 which meshes with a gear 42 located on a shaft 43, which, in turn, carries a gear 44 which is in mesh with a ring gear 45 on the inner side of a housing 46, forming part of the head 16.

The tubular housing 14 has an opening in its side from which a pair of lifts 47, 47 project and support the shaft 43 on which the gears 42 and 44 are located.

Thus it can be seen, that the upper head 15 is driven in one direction, while the lower head 16 is driven in the opposite direction.

Each head has two propeller blades, the upper head having blades 48, 48 while the lower head has blades 49, 49.

Certain mechanism relative to the adjusting of the pitch of these blades is common in both the heads 15, 16 and a description of one will suffice for both as follows:

Each propeller blade has a shank 49 which extends through a suitable bearing assembly 50 and is equipped within the corresponding head housing with a bevel gear 51 which meshes with a bevel gear 52, the latter carrying a gear 53 which meshes with a slide rack 54. This slide rack 54 has a longitudinally disposed stem 55 which is disposed through a barrel 56 supported by trunnions 57, 57 which project into slot openings 58, 58 in the lower ends of the legs 59 of a bellcrank 60 which is rockably supported by the upper end of posts 61.

The upper horizontal end portion of each bellcrank 60 has a slot 62 therein for receiving a cross pin 63 in a bifurcated portion of a ring 64. An inside ring 65 supports the outer ring 64 and ball bearings or other types of bearings 66 are provided between these two rings. Spokes 67 extend inwardly through slots 68 in the tubular housing 14, from the inside ring 65 to a hub 69.

As can be seen in Figure 3, a nut 70 is provided on the inner end of the stem 55 of the rack 54 (also see Figure 13) and interposed between the nut 70 and the barrel 56 is a coiled compression spring 71.

A roller 72 is carried by the nut 70 and rides a cam annulus 73, this annulus being constructed as suggested in Figures 10 and 15. The cam is provided with risers at its upper and lower portions and these risers are denoted by reference characters 74, 75. When this cam 73 is properly adjusted upwardly or downwardly, the risers 73, 74, depending upon the direction of adjustment of said cam, will be located so as to be engaged by one or the other of the rollers 72, as the case may be, and the corresponding rack 54 will be pushed outwardly to change the pitch of the propeller blade to which the rack is operatively connected, as in the manner already described. Thus the cam 72 is settable, manually, to cause automatic variation of the pitch of either propeller blade of the pair relative to the pitch of the other blade at certain points in the cycle of revolution of the pair of blades, and thereby vary the bite of either blade of the pair relative to that of the other blade. The result is that tendency to side slip, or drift, of the helicopter, if not prevented by rotation of the two pairs of blades in opposite directions, relatively, may be prevented by differential variation in the pitch of the blades of either or both pairs of said blades.

Manual means for varying the pitch of the same pair of propeller blades is provided comprising a swingably mounted straddling yoke 76 pivoted at one end and having its opposite end connected to a control rod 77, the intermediate portions of this yoke 76 being connected as at 78 to the hub 69, to the end that when the rod 77 is operated, the blades will be manually adjusted. It can be seen in Figure 29, that the rod 77 is operated by a bellcrank 78, a connecting rod 79 and a hand lever 80.

The cam ring 73 in the upper head 15 is controlled by a rod 81 which operates a second straddling yoke 82 which is connected as at 83 to spokes 84 of the cam 73. The rod 81 extends down to connect to a bellcrank 85 which, in turn, by a connecting rod 86 extends to a hand lever 87 and in this manner the automatic means for the upper head 15 is controllable.

The manual pitch changing means for the lower head 16 is very similar excepting that the ring 65 of this head is controlled by a Y-shaped pivotal member or link 88 which has a rod 89 extending downwardly therefrom and by a bellcrank 90 is connected to a rod 91 which, in turn, is connected to a hand lever 92, and thus the manual means for changing the pitch of the blades of the lower head is operative.

The automatic means for the lower head is taken care of by a straddling yoke 93 which is connected to the spokes of the cam 73 as at 94 and extending downwardly from this straddling yoke 93 is a rod 95 which connects to a bellcrank 96 and this, in turn, by way of a rod 97 connects to a hand lever 98 and through this agency, the lower automatic means for the blades of the corresponding head are set for automatic operation.

As can be seen in Figure 12, the housing 14 has certain slots 99, 100 therein for accommodating the spokes of the ring 65 and cam 73, in both the upper and lower head portions of said housing.

As is clearly shown in Figure 27, compression springs 101 are provided at each side of the ears 29 so that the shafts will not have a tendency to rotate when the same have been adjusted to the desired extent.

Thus it can be seen, that the helicopter can be adjusted in various manners to take care of direction and incidental contingencies that may arise during a flight.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A helicopter comprising a body, a power plant in the body, a propulsion assembly above the body, and drive means to said propulsion assembly from the power plant, said propulsion assembly comprising a pair of upper and lower propeller heads operative in opposite directions, each of said heads being provided with a pair of propeller blades, settable means for varying the pitch of the blades in each pair uniformly in the pairs and differentially as between the pairs, and settable means for causing during rotation of said blades automatic variation of the pitch of either blade of either pair during a portion of the cycle of rotation of the same.

2. A helicopter comprising a body, a power plant in the body, a propulsion assembly above the body, and drive means to said propulsion assembly from the power plant, said propulsion assembly comprising a pair of upper and lower propeller heads operative in opposite directions, each of said heads being provided with a pair of propeller blades, settable means for varying the pitch of the blades in each pair uniformly in the pairs and differentially as between the pairs, and settable means for causing during rotation of said blades automatic variation of the pitch of either blade of either pair during a portion of the cycle of rotation of the same, comprising vertically adjustable cams, and rack and pinion devices operative by said cams and operatively connected to the blades to change the pitch thereof.

HAROLD B. FRASHER.

REFERENCES CITED

The following references are of record in the file of this patent:

UNITED STATES PATENTS

| Number | Name | Date |
| --- | --- | --- |
| 2,216,080 | Johnson | Sept. 24, 1940 |
| 2,037,745 | Vaughn | Apr. 21, 1936 |
| 1,345,101 | Perry | May 15, 1940 |
| 1,819,075 | Derr | June 29, 1920 |
| 2,256,918 | Young | Sept. 23, 1941 |

FOREIGN PATENTS

| Number | Country | Date |
| --- | --- | --- |
| 521,218 | British | May 15, 1940 |
| 393,976 | British | June 16, 1933 |